United States Patent [19]
Andoniev et al.

[11] 3,818,870
[45] June 25, 1974

[54] SYSTEM FOR EVAPORATIVE COOLING OF METALLURGICAL UNITS

[76] Inventors: Sergei Mikhailovich Andoniev, Prospekt Pravdy, 5, kv. 60; Leonid Borisovich Zilberman, Ekonomicheskaya ulitsa, 1 a, kv. 12; Gennady Alexandrovich Kudinov, Prospekt Gagarina, 8 mikroraion, 32, kv. 203; Dorina Borisovna Kutsykovich, Prospekt Lenina, 39, kv. 54; Vladimir Afanasievich Lukashev, Ulitsa Tankopia, 12, kv. 25; Jury Borisovich Raikovsky, Prospekt Lenina, 11, kv. 16; Oleg Vladimirovich Filipiev, Prospekt Pravdy, 5, kv. 41b, all of Kharkov, U.S.S.R.

[22] Filed: July 10, 1972

[21] Appl. No.: 270,286

[52] U.S. Cl. ............... 122/7 R, 122/407, 122/489, 266/32
[51] Int. Cl. ..................... F22b 37/26, F22d 7/04
[58] Field of Search ............ 122/7 R, 407, 489, 1 C

[56] References Cited
UNITED STATES PATENTS
3,608,526   9/1971   Kemmetmueller ............... 122/7 R FOREIGN PATENTS OR APPLICATIONS
636,604   0/1950   Great Britain ............... 122/489

Primary Examiner—Albert W. Davis, Jr.
Assistant Examiner—S. J. Richter
Attorney, Agent, or Firm—Holman & Stern

[57] ABSTRACT

A system for evaporative cooling of metallurgical units comprising closed natural circulation loops which consist of the elements being cooled and steam separators communicating with the elements being cooled via pipelines adapted for feeding water and discharging a steam-water mixture, provision is also made for water storage vessels adapted for feeding the device with the water, the vessels being arranged below the steam separators and connected by pipelines with a water supply and a jet pump introduced into the water feed pipeline of each circulation loop, the vessel and the jet pump being mounted so as to enable the pump to draw in the water into the circulation loop to offset its losses in the course of operation of the device, the present invention is directed toward a reduction in the cost of manufacture and operation of the device for evaporative cooling of metallurgical units.

5 Claims, 1 Drawing Figure

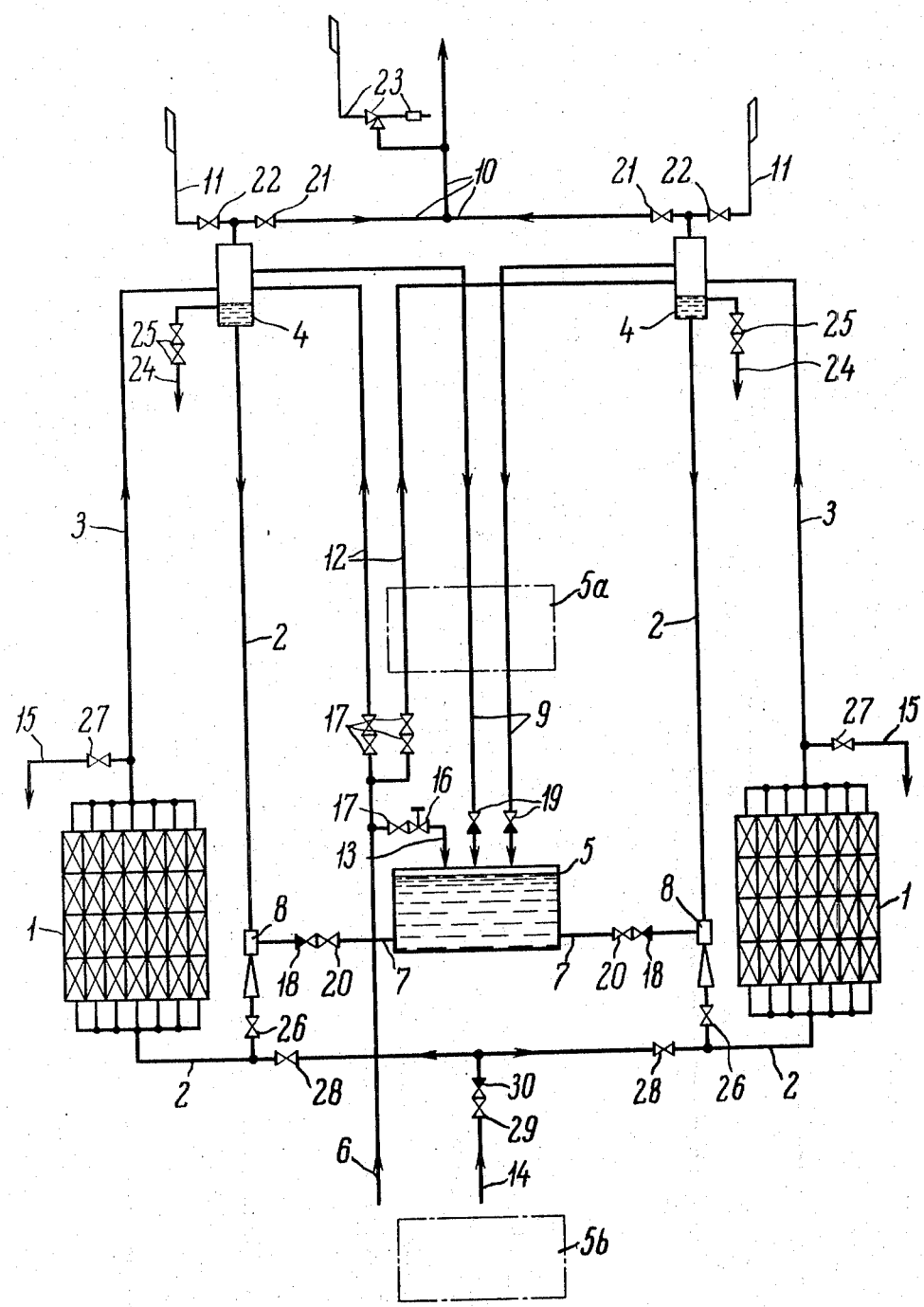

SYSTEM FOR EVAPORATIVE COOLING OF METALLURGICAL UNITS

BACKGROUND OF THE INVENTION

1. Field of the Invention

The present invention relates to the field of evaporative cooling of metallurgical units.

2. General Description of the Prior Art

Known in the art is a device for evaporative cooling of metallurgical units comprising closed natural circulation loops composed of the elements being cooled absorbing the heat flux; steam separators adapted for separation of steam and water and in communication with said elements being cooled by pipelines for supplying water and discharging a steam-water mixture, and of storage vessels for chemically purified and deaerated water and for delivering it to the device; the vessels being coupled with a water supply and with the circulation loop via pipelines; the device including also pipelines for discharging steam from said steam separators.

In the known device the circulation loops are fed from the vessels which consist of steam and water spaces.

In the steam space of the above vessel steam separation takes place, the separator being restructed from above by a perforated sheet which acts as an additional steam drier and from below — with the water level.

The water space of the above vessel is adapted for keeping make-up water and feeding the natural circulation loops.

To set in motion the cooling water contained in the natural circulation loops a hydrostatic head is necessary which is developed in the known device owing to a difference in water level within the vessel and the bottom point of the elements being cooled.

On account of design conditions of the metallurgical unit, the vessel cannot be arranged at the design height which is necessary to provide the requisite hydrostatic head in the natural circulation loops, this resulting in a necessity to dispose the said vessels at a considerable height (about 35–45 m) on a metallurgical unit in the zone with contaminated atmosphere.

However, the arrangement of the steam separators combined with water spaces and fitted with master gauges and valves for controlling the device at a considerable height in the contaminated atmosphere in cumbersome air-tight passages provided with suction-and-exhaust ventilation necessitates the construction of thick and heavy supporting metal structures which increases the cost of construction and erection work whereas the delivery of water from the water supply to the vessel located at a large height results in higher energy consumption.

SUMMARY OF THE INVENTION

The basic object of this invention is to provide a device for evaporating cooling of metallurgical units which allows arranging a water vessel at the lowest possible level with respect to the bottom point of the elements being cooled.

A further object of the invention is to provide a device for evaporative cooling which allows it possible to reduce the weight of supporting metal structures of the vessels and to eliminate air-tight passages with suction-and-exhaust ventilation.

Still further object of the invention is the provision of a device for evaporative cooling which offers a reduction in constant power consumption required for feeding make-up water from a water supply to the vessel disposed at a large height on a metallurgical unit.

Yet another object of the invention is to provide a device for evaporative cooling which allows improved labour conditions and enhanced safety of attending personnel.

More specifically to achieve these and other objects there is provided a device for evaporative cooling of metallurgical units comprising closed natural circulation loops composed of the elements being cooled which absorb the heat flux; steam separators adapted for separation of steam and water and connected with said elements being cooled by pipelines for feeding water and discharging a steam-water mixture and storage vessels for chemically purified deaerated water and for delivering it to the device, said vessels being coupled by pipelines with a water supply and with the circulation loops, the device comprising also pipelines for discharging steam from said steam separators.

According to the invention, the water storage vessels are mounted apart from and below the steam separators and in the feed pipeline of each natural circulation loop provision is made for a jet pump in communication with the storage vessel and located below a connecting piece for feeding the steam-water mixture to the steam separator at such a level that a hydrostatic pressure built-up at the inlet of the working nozzle of the jet pump ensures the vacuum value which is necessary for delivering the makeup water to the circulation loop from the vessel arranged with respect to the jet pump at a level which enables the makeup to be delivered, the steam separator being connected with the upper part of the vessel by a pipeline.

The pipeline connecting the vessel with the steam separator is preferably brought into communication with the latter above the connecting piece for the steam-water mixture which prevents water from being entrained into the pipeline with the incoming steam-water mixture and is conducive to maintaining the steam dry when the water level in the steam separator rises above normal values.

The vessel can be disposed above the jet pump, at the same level with the latter or below the pump which makes it possible to arrange the vessel in a convenient location.

The present invention results in a system which allows arranging the water storage vessel apart from the steam separator at the level of the platform for controlling the metallurgical unit, i.e. below the jet pump but not lower than the vacuum value produced by the pump which ensures a reduction in the weight of the supporting metal structures, eliminates the need in a passage with suction-and-exhaust ventilation and decreases the energy consumption for delivering the makeup water to the vessel, all this leads to a substantial reduction in the cost of manufacture and operation of the device for evaporative cooling of metallurgical units.

A fuller understanding of the nature of the invention will be had from the following description of an exemplary embodiment, taken in conjunction with the accompanying drawing in which:

BRIEF DESCRIPTION OF THE DRAWING

The single FIGURE is a diagramatic layout of the system for evaporative cooling of metallurgical units accomplished in conformity with the invention.

DESCRIPTION OF THE PREFERRED EMBODIMENT

The present device comprises elements 1 being cooled within which water is passed to extract the heat flux.

In order to supply the water to the elements 1 being cooled and to discharge from them a steam-water mixture use is made of pipelines 2 and 3 accordingly connecting the elements being cooled with steam separators 4 which function to separate steam and water.

The system of the pipelines 2 and 3, steam separators 4 and the elements 1 being cooled coupled by the above pipelines forms a closed natural circulation loop, i.e., heated liquid rises.

For the sake of simplicity, only one set of the parts included in the device (one steam separator, one closed natural circulation loop etc.) will be described hereinafter, though in practice the system usually consists of a number of such similar sets or various combinations of these, such as are shown in the drawing in which provision is made for two sets of the natural circulation loops and only one common water storage vessel.

Vessel 5 is designed for storage of chemically purified deaerated water and communicates with a make-up water supply (not shown in the drawing) via a pipeline 6 and with a jet pump 8 mounted on the pipeline 2 via a pipeline 7.

The jet pump 8 is intended to delivering make-up water to the pipeline 2 of the natural circulation closed loop from the vessel 5. The make-up water offsets the losses of cooling water due to its evaporation when extracting the heat flux from the element 1 being cooled and owing to partial replacement of the cooling water — blow-downs performed to maintain at acceptable levels the salt content of the cooling water.

The steam separator 4 communicates at its upper end with the upper part of the vessel 5 via a pipeline 9 which is adapted to equalize the pressure in the vessel 5 and in the circulation loop which is necessary for supplying the make-up water to the loop through the pipeline 7.

A pipeline 10 at the upper end of separator 4 serves to discharging steam from the steam separator 4 into a steam main (not shown in the drawing) under continuous operating conditions and a pipeline 11 — under non-stationary conditions (starting period) serves to discharge steam exhausted to the atmosphere.

A pipeline 12 is adapted for feeding water into the natural circulation loop at the beginning of operation and a pipeline 13 — for continuous delivery of the make-up water to the vessel 5 during operation.

Pipelines 14 and 15 serve for feeding (14) and discharging (15) service water when used for cooling purposes during preventive maintenance.

A level regulator 16 is adapted to keep a constant water level in the vessel 5.

Valves 17 serve for cutting-off water delivery from the pipeline 6 to the vessel, whereas (one-way), non-return valves 18 and 19 are intended to prevent water from flowing back from the natural circulation loop to the vessel 5 and then to the pipeline 9.

A valve 20 is designed to control and shut off (as required) the supply of the make-up water to the jet pump 8.

The pipeline 10 communicates with the steam separator 4 through a valve 21 which is also adapted for adjusting pressure in the system loop.

A valve 22 serves to provide communication between the steam separators 4 and the steam pipeline 11 which exhausts to the atmosphere when the device operates under the atmospheric pressure.

A safety valve 23 is adapted to protect the system in case the pressure within it rises above the pre-set value.

A pipeline 24 functions to discharge blowdown water from the steam separator 4 and a valve 25 — to control the amount of water being blown-down and to cut it off.

A valve 26 is designed for cutting off the feed pipeline 2 when the device is switched from evaporative cooling to the use of service water for cooling purposes during preventative maintenance and valves 27, 28 and 29 are intended for supplying (28, 29) and discharging (27) water from the element 1 being cooled.

A one-way non-return valve 30 is adapted to prevent water from flowing back along the pipeline 14 which is adapted for supplying the service water for cooling the element 1 being cooled during the preventive maintenance.

Prior to starting the device, the natural circulation loop comprising the element 1 being cooled, steam separator 4, pipelines 2 and 3 and vessel 5 will be filled with chemically purified and deaerated water delivered from the water supply to the pipeline 6 via pipelines 12 and 13. The water will be delivered when the valves 21, 25, 27, 28 and 29 are closed and the valves 17, 20, 22 and the level regulator 16 — opened, the latter, i.e., 16 is so mounted that the water level within the vessel 5 will ensure the requisite amount of reserve water. As soon as the system is filled with water, the level in the steam separator 4 not exceeding that of the inlets for connecting pieces for delivering the steam-water mixture to the pipeline 3, the valve 17 is shut off.

Extraction of the heat flux from the elements 1 being cooled by the water results in a change in its state of aggregation which ensures natural circulation in the loops in case the requisite hydrostatic head is produced.

In the device operating with the steam under the atmospheric pressure, the steam is discharged along the pipeline 11, the valve 22 being open in this case.

A rise in the pressure within the device is achieved by partially closing the valve 22.

When the pressure in the device is equal to that in the pipeline 10, the valve 21 is opened.

Dissolved salt contents in the water circulating via the elements being cooled is maintained by the blowdown which is effected by opening the valves 25 and 17 of the pipeline 12 whereupon the blowndown water is partially replaced by fresh chemically purified deaerated water.

Water constantly evaporated in the device owing to the extraction of the heat flux from the elements 1 being cooled is compensated by or offset with water fed from the vessel 5 drawn in by the jet pump 8 via the pipeline 7. In case the steam pressure in the device rises above the specified value, the safety valve 23 opens excess steam is exhausted to the atmosphere and the pressure is reduced to a pre-set value.

For carrying out a preventive maintenance program, the system shall be switched to cooling with service water.

This is performed as follows, the steam pressure in the insert is reduced to the atmospheric value by gradually opening the valve 22 next, first the valve 29 and then valves 27 and 28 are uncovered for supplying the service water to the elements 1 being cooled, the valve 26 being covered to prevent the water from being entrapped into the pipeline 2.

On completion of said preventive maintenance, the device is converted to evaporative cooling which is effected by following the reverse sequence of operations, i.e. the valve 26 is uncovered and and first the valves 27 and 28 (simultaneously) and then the valve 29 are covered.

Following that, as soon as the natural circulation loop commences to operate under steady-state conditions, the steam pressure in the device is increased, i.e. the valve 22 is covered, and when the steam pressure in the device is equivalent to that in the pipeline 10, the valve 21 is open.

Depending on the conditions under which the present device is to be employed, the vessel 5 may be disposed at the level of the jet pump 8, as shown by solid lines on the drawing of 5; may be located above the level of the pump 8, as indicated in the drawing by 5a, or finally — below the jet pump 8 — at 5b; in the latter case, the level at which the vessel 5b is disposed below the jet pump 8 is limited by the vacuum value or suction produced or developed by the pump.

We claim:

1. In a system for evaporative cooling of metallurgical units comprising, in combination: at least one closed natural circulation loop including therein an element being cooled and absorbing the heat flux;

a steam separator operatively connected in said loop for separating steam from water and communicating by a pipeline with the element being cooled for feeding water and discharging a steam-water mixture, to the separator;

a storage vessel for chemically purified deaerated make-up water including means for supplying the water to the system, the vessel comprising a unit separate from the steam separator, and positioned below the steam separator and including pipeline means operatively connecting the water supply of said vessel with said natural circulation loop;

jet pump means operatively connected in said pipeline means and said natural circulation loop, communicating with said vessel and located below a connection for feeding a steam-water mixture to said separator at such a level that a hydrostatic pressure built up at the inlet of said jet pump means ensures the vacuum value necessary for delivering make-up water from said vessel to said closed circulation loop, said vessel being located in relation to the jet pump at a level which insures that make-up water supply to the closed circulation loop can be effected, said steam separator being connected in the natural circulation loop being connected by a pipe line to the upper part of said vessel.

2. In a system as claimed in claim 1 in which the last-mentioned pipe line is connected to said separator above the connection of said separator to the steam-water pipe line from the element being cooled.

3. In the system as claimed in claim 1 in which said vessel is arranged above said jet pump.

4. In the system as claimed in claim 1 in which said vessel is disposed substantially at the same level as said jet pump.

5. In the system as claimed in claim 1 in which said vessel is arranged below said jet pump at a level limited by the vacuum valve produced by the pump.

* * * * *